US009474053B2

(12) United States Patent
Kulal et al.

(10) Patent No.: US 9,474,053 B2
(45) Date of Patent: Oct. 18, 2016

(54) RESOURCE ALLOCATION FOR CONTROL CHANNEL

(71) Applicant: CISCO TECHNOLOGY, INC., San Jose, CA (US)

(72) Inventors: Sushanth Chandappa Kulal, Mangalore (IN); Shashank Misra, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 295 days.

(21) Appl. No.: 14/196,656

(22) Filed: Mar. 4, 2014

(65) Prior Publication Data

US 2015/0257141 A1    Sep. 10, 2015

(51) Int. Cl.
*H04W 72/04* (2009.01)
*H04L 5/00* (2006.01)
*H04W 72/08* (2009.01)

(52) U.S. Cl.
CPC ........ *H04W 72/0406* (2013.01); *H04L 5/0053* (2013.01); *H04W 72/087* (2013.01)

(58) Field of Classification Search
CPC ......... H04W 72/0406; H04W 72/087; H04W 72/04–72/10; H04W 72/0413; H04W 72/0453; H04W 72/06; H04L 5/0053; H04L 5/003; H04L 5/0055; H04L 5/0057
USPC .................................................. 370/329, 330
See application file for complete search history.

(56) References Cited

U.S. PATENT DOCUMENTS

| | | | | |
|---|---|---|---|---|
| 8,717,995 B2* | 5/2014 | Sato | ...................... | H04W 72/08 370/328 |
| 2008/0045227 A1* | 2/2008 | Nagai | ................. | H04W 72/082 455/450 |
| 2008/0219370 A1* | 9/2008 | Onggosanusi | ....... | H04B 7/0417 375/260 |
| 2009/0047912 A1* | 2/2009 | Lee | ........................ | H04L 1/0028 455/69 |
| 2009/0257392 A1* | 10/2009 | Hosein | ................ | H04W 72/048 370/329 |
| 2010/0190469 A1* | 7/2010 | Vanderveen | ............ | H04L 12/14 455/406 |
| 2012/0026873 A1* | 2/2012 | Spinar | ................... | H04W 28/20 370/230 |
| 2012/0099430 A1* | 4/2012 | Vos | ........................ | H04W 28/02 370/235 |

OTHER PUBLICATIONS

Bruggen, Dr. Thomas. "R&S® TS 8980 Test System Analyzes LTE Quality Indicators: CQI, PMI and RI." Wireless Technologies: Conformance Test Systems. No Date Listed. 4 pages.

(Continued)

*Primary Examiner* — Mark Rinehart
*Assistant Examiner* — Kenneth P Hunt
(74) *Attorney, Agent, or Firm* — Patent Capital Group

(57) ABSTRACT

Embodiments of the present disclosure include a method of resource allocation. The method includes assigning resources intended for a control channel of a mobile network to multiple resource groups. At least one resource group may include multiple resources, where the resources have at least an associated periodicity and an associated delay tolerance. The assignment may be based on the delay tolerances of the resources. The method further includes determining a composite delay tolerance of the resource groups based on the corresponding delay tolerances of the resources in the resource group. The method further includes reserving resources associated with the control channel for the resource groups based on the composite delay tolerance of the resource groups. The method further includes establishing the control channel with a user equipment (UE), where the control channel is established using the reserved resources.

20 Claims, 11 Drawing Sheets

(56) References Cited

OTHER PUBLICATIONS

ETSI TS 136 104 v11.7.0. LTE; Evoloved Universal Terrestrial Radio Acces (E-UTRA); Base Station (BS) Radio Transmission and Reception (3GPP TS 36.104 Version 11.7.0 Release 11). Jan. 2014. 138 pages.
ETSI TS 136 211 V11.5.0. LTE; Evolved Universal Terrestrial Radio Access (E-UTRA); Physical Channels and Modulation (3GPP TS 36.211 Version 11.5.0 Release 11). Jan. 2014. 122 pages.
ETSI TS 136 213 v11.5.0. LTE; Evolved Universal Terrestrial Radio Access (E-UTRA); Physical Layer Procedures (3GPP TS 36.213 Version 11.5.0 Release 11). Jan. 2014. 184 pages.
ETSI TS 136 521-1 v9.3.0. LTE; Evolved Universal Terrestrial Radio Access (E-UTRA); User Equipment (UE) Conformance Specification; Radio Transmission and Reception; Part 1: Confirmance Testing (3GPP TS 36.521-1 Version 9.3.0 Release 9). Jan. 2011. 503 pages.
Ku, Gwanmo. "Resource Allocation in LTE." Adaptive Signal Processing and Information Theory Research Group. Drexel University, Nov. 11, 2011. 33 pages.

\* cited by examiner

US 9,474,053 B2

RESOURCE ALLOCATION FOR CONTROL CHANNEL

FIELD OF THE DISCLOSURE

The present disclosure relates generally to systems and methods for resource allocation of control channel resources in a telecommunications network.

BACKGROUND

Wireless networks are telecommunications networks that use radio waves to carry information from one node in the network to one or more receiving nodes in the network. Cellular telephony is characterized by the use of radio cells that provide radio coverage for a regional or geographic area, with multiple cells arranged to provide contiguous radio coverage over a larger regional or geographic area. Wired communication can also be used in portions of a wireless network, such as between cells or access points.

Wireless communication technologies are used in connection with many applications, including, for example, satellite communications systems, portable digital assistants (PDAs), laptop computers, and mobile devices (e.g., cellular telephones, user equipment). Users of such devices can connect to a network (e.g., the Internet). When these devices send data over the network, gateways in the network allocate resources to communication channels, for use by the devices.

BRIEF DESCRIPTION OF THE DRAWINGS

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of the invention, the scope of which is set forth in the claims that follow.

DESCRIPTION OF EXAMPLE EMBODIMENTS

Overview

Embodiments of the present disclosure include a method of resource allocation. The method includes assigning resources intended for a control channel of a mobile network to multiple resource groups. At least one resource group may include multiple resources, where the resources have at least an associated periodicity and an associated delay tolerance. The assignment may be based on delay tolerances of the resources, or more specifically, on delay tolerances of Quality of Service bearers for supporting the resources. The method further includes determining a composite delay tolerance of the resource groups based on the corresponding delay tolerances of the resources in the resource group. The method further includes reserving resources associated with the control channel for the resource groups based on the composite delay tolerance of the resource groups. The method further includes establishing the control channel with a user equipment (UE), where the control channel is established using the reserved resources.

Example Embodiments

Resource allocation generally describes ways of distributing channel resources among user equipment (UEs) in a mobile network. Resources may have associated "periodicities," which indicate how often the resource should be distributed to a particular UE. Resources may also have an associated "slot offset," which indicates whether the resources should be allocated starting at time t=0, or allocated starting at a later time determined based on the slot offset. The present resource allocation allocates resources using quantized periodicities with resource groups. The present resource allocation allocates resources to UEs generally based on need by the UE for a particular supported service, and specifically based on a "delay tolerance" that indicates how sensitive the service is to delays in data packet delivery. For example, the delay tolerance may include Quality of Service (QoS) parameters. The present resource allocation assigns resources into resource groups, based on an associated delay tolerance. Generally, resources with lower delay tolerance are grouped together and resources with higher delay tolerance are grouped together. The present resource allocation assigns a composite delay tolerance to the resource groups. For example, the composite delay tolerance may be a mean periodicity of the individual periodicities. The mean periodicities may be generally constant within resource groups, but may be variable across resource groups. The present resource allocation proceeds to reserve resources for UEs based on determining an associated ratio of total uplink channel resources for the resource groups. For example, the ratios may be determined based on a density of QoS within a cell.

Figure 1:
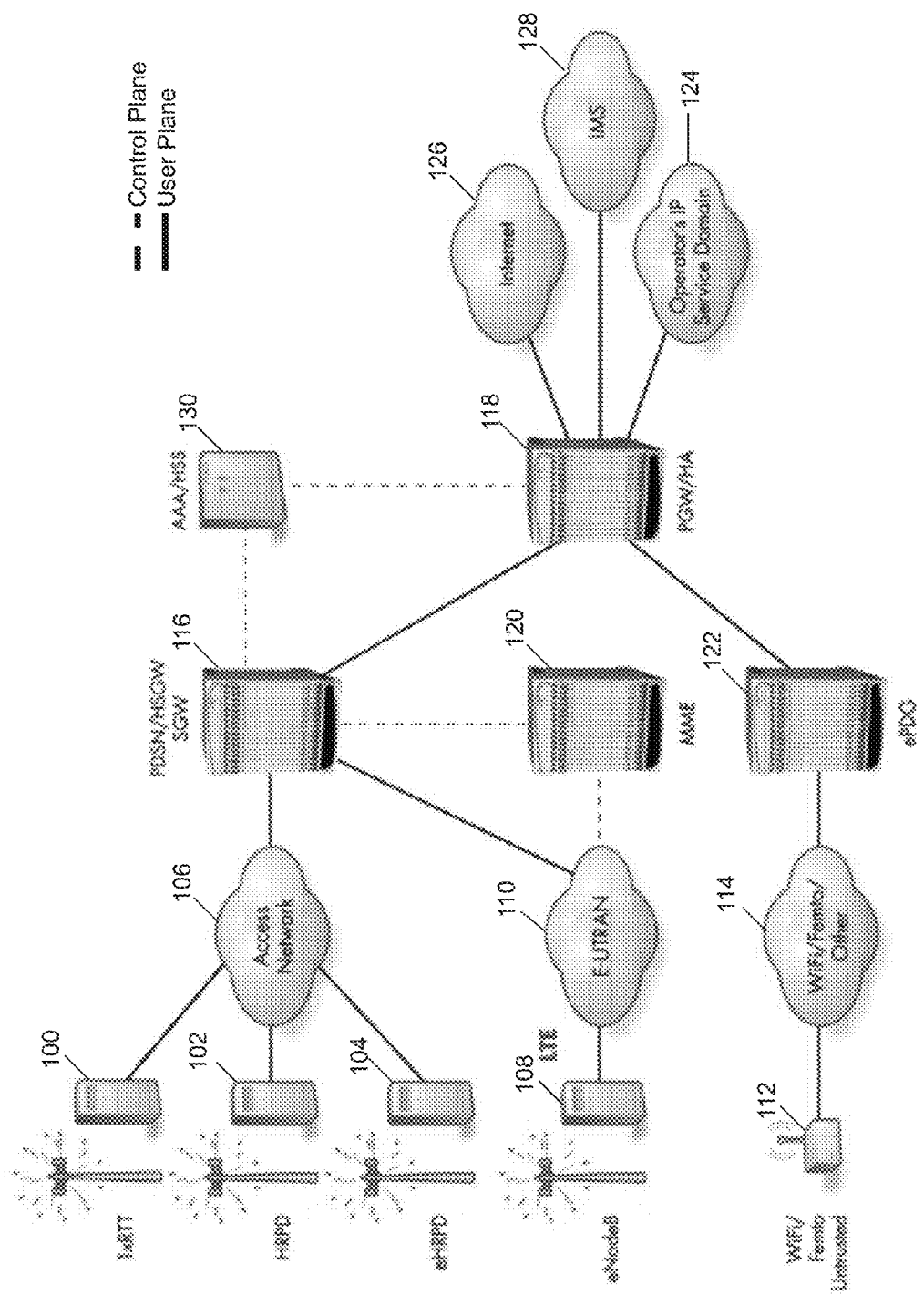
FIGS. 1 and 2 illustrate communication networks including a long term evolution (LTE) topology that implements resource allocation mechanisms in accordance with certain embodiments.

FIG. 1 illustrates a communication network that includes a resource allocation mechanism in accordance with certain embodiments. FIG. 1 includes a number of radio access technologies such as a 1xRTT transceiver 100, a high-rate packet data (HRPD) transceiver 102, and an evolved high-rate packet data (eHRPD) transceiver 104, each of which can connect to an access network 106. An evolved Node B (eNodeB) transceiver 108 is an LTE network radio network component that connects to an Evolved UMTS Terrestrial Radio Access Network (E-UTRAN) 110. eNodeB 108 is generally responsible for resource allocation for uplink control channels for a UE. Other radio access technologies such as WiFi, Femto, WiMAX, or any other radio spectrum technology can use transceiver 112 to connect to the network using a broadband or other access network.

The access network 106 can communicate with an access gateway 116 that implements a combination of functionalities such as a packet data serving node (PDSN), a HRPD serving gateway (HSGW), and a serving gateway (SGW). In operation, the PDSN functionality can be used with 1xRTT 100 and HRPD 102, the HSGW functionality can be used with eHRPD 104, and the SGW functionality can be used with eNodeB 108. The access gateway 116 can communicate with an anchor gateway 118, which can implement a packet data network gateway (PGW) and a Home Agent (HA) and a mobility management entity (MME) 120. On the access network side, the anchor gateway 118 can also communicate with an evolved packet data gateway (ePDG) 122 which provides connectivity to the WiFi/Femto/other transceiver 112. On the packet core side, the anchor gateway can communicate with the operator's IP service domain 124, the internet 126, and IP multimedia subsystem (IMS) 128. An authentication, authorization, and accounting (AAA) server/home subscriber server (HSS) 130 can communicate with the access gateway 116, the anchor gateway 118, or both.

Home Subscriber Server (HSS) 130 can be a master user database that supports IMS network entities that handle calls. HSS 130 stores subscription-related information (subscriber profiles), performs authentication and authorization of the user, and can provide information about the subscriber's location and IP information. AAA server 130 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA functionality of AAA/HSS 130 can communicate with the access gateway 116 for charging purposes.

The LTE communication network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communications network includes MME 120, SGW 116 and PGW 118 components. In some embodiments, one or more EPC components can be implemented on the same gateway or chassis as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PGW). For idle state UEs, the SGW terminates the down link data path and triggers paging when down link data arrives for the UE. The SGW manages and stores UE contexts, e.g. parameters of the IP bearer service and network internal routing information. The SGW also performs replication of the user traffic in case of lawful interception.

The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 standards (CDMA 1X and EVDO).

The MME resides in the EPC control plane and manages session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN). The MME can also be integrated with 2G/3G elements, such as the SGSN and GGSN. This integration is the key to mobility and session management interworking between 2G/3G and 4G mobile networks.

MME 120 is a control-node for the LTE access network. The MME is responsible for UE tracking and paging procedures including retransmissions. MME 120 handles the bearer activation/deactivation process and is also responsible for node selection of an SGW and PGW for a UE at the initial attach and at time of an intra-LTE handover. The MME also authenticates the user by interacting with the HSS 130. The MME also generates and allocates temporary identities to UEs and terminates Non-Access Stratum (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming UEs.

ePDG 122 is responsible for interworking between the EPC and fixed non-3GPP access technologies such as a WiFi. ePDG 122 can use IPSec/IKEv2 to provide secure access to the EPC network. Optionally, the ePDG can use Proxy Mobile IPv6 (PMIPv6) to interact with the PGW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 2:
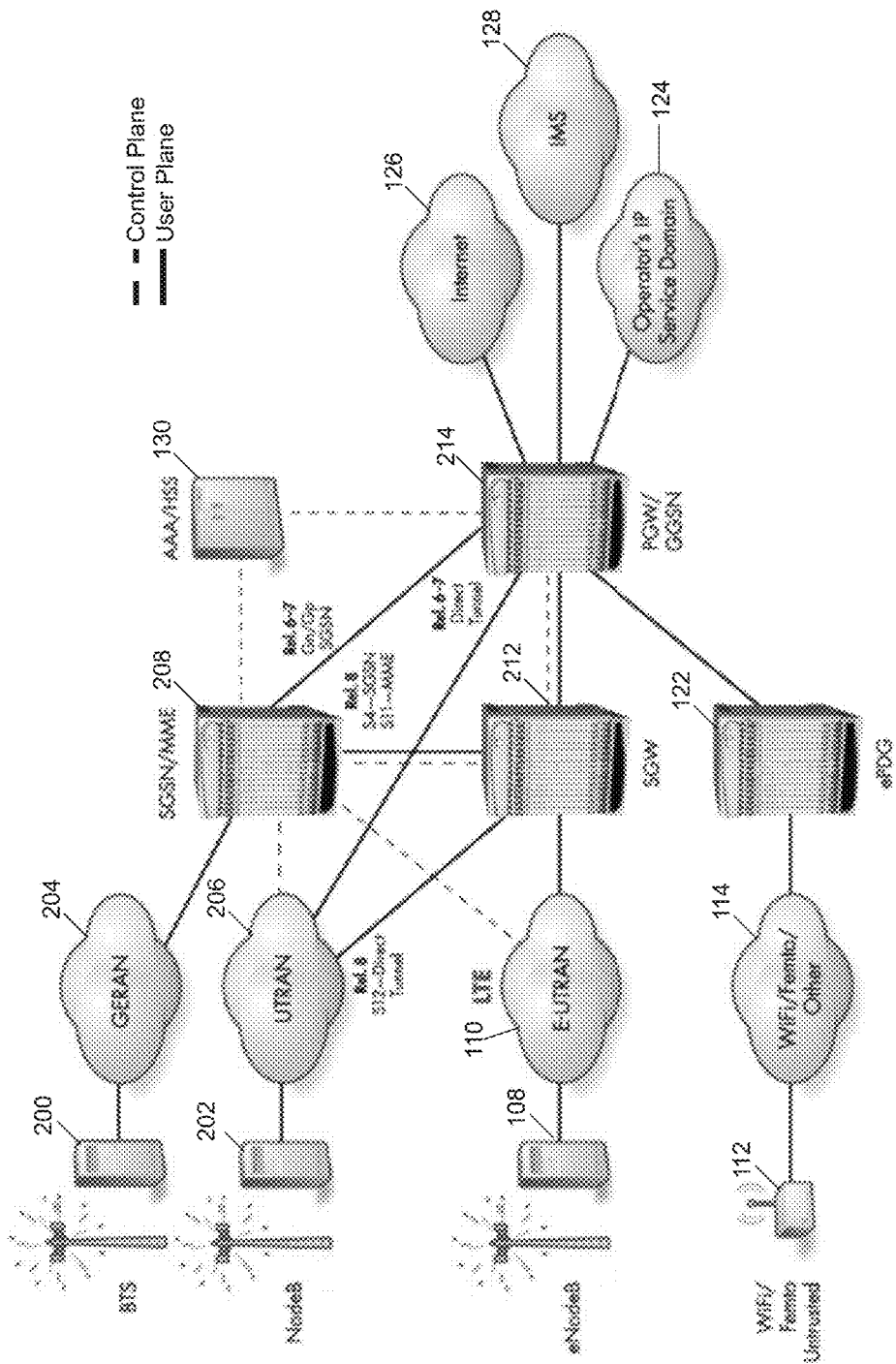

FIG. 2 illustrates a communication network that implements a resource allocation mechanism with legacy universal mobile telecommunications systems (UMTS) network devices in accordance with certain embodiments. The legacy transceivers include base transceiver station (BTS) 200 and NodeB transceiver 202. BTS 200 can communicate with a GSM EDGE Radio Access Network (GERAN) 204 and NodeB 202 can communicate with a UMTS terrestrial radio access network (UTRAN) 206. The serving GPRS support node (SGSN) can be implemented on a gateway 208 with a mobility management entity (MME). GERAN 204 can communicate through the SGSN functionality on gateway 208 to serving gateway (SGW) 212 or gateway GPRS support node (GGSN)/PGW 214.

In some embodiments, the present resource allocation mechanisms can be implemented on a base station, such as eNodeB 108, BTS 200, or NodeB 202. The base stations can access and maintain information relating to the communication session, the subscriber, the available network nodes, the radio bearers, and the policies relating to the communication session. eNodeB 108, BTS 200, or NodeB 202 may be used to provide various services to a mobile device and implement resource allocation for mobile devices. The communication networks also allow provision of applications such as VoIP, streaming video, streaming music, multi-user gaming, location based services, and a variety of content delivered to a mobile node. Residing within eNodeB 108, BTS 200, and NodeB 202 can be one or more network processing units, line cards, as well as packet and voice processing cards, as described below in connection with FIGS. 10 and 11.

Figure 3:
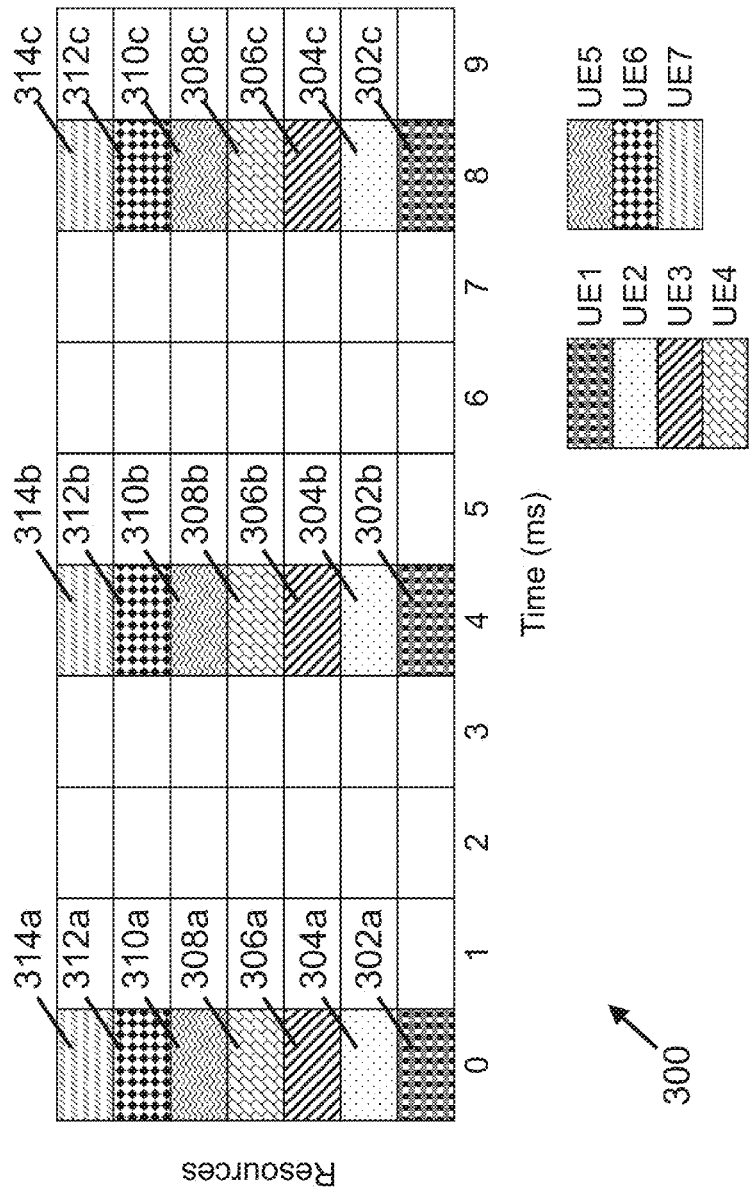
FIG. 3 illustrates an example of a resource allocation in which the network allocates resources with constant periodicity, in accordance with certain embodiments.
Figure 4:
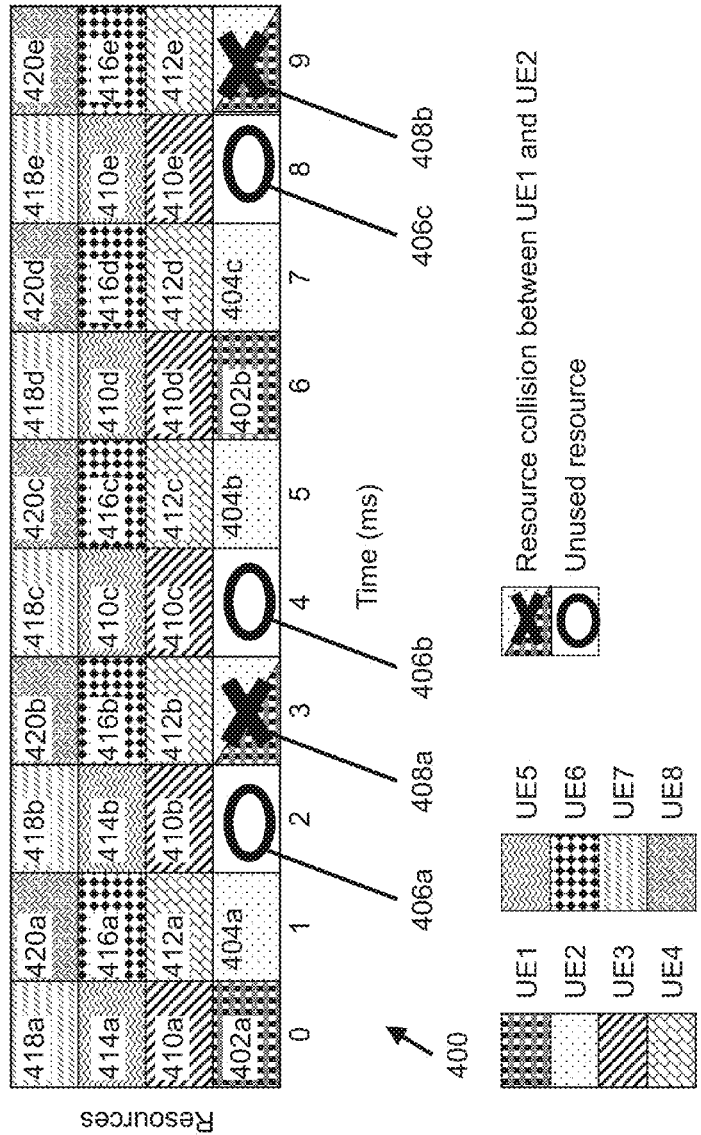
FIG. 4 illustrates an example of a resource allocation with variable periodicity, in accordance with certain embodiments.

FIG. 3 allocates resources with constant periodicity, in accordance illustrates an example of a resource allocation 300 in which the network with certain embodiments. FIGS. 3 and 4 illustrate variants of resource allocation of control channels, such as a physical uplink control channel (PUCCH) in a Long Term Evolution (LTE) mobile network. FIG. 3 illustrates a resource allocation with constant periodicity, and FIG. 4 illustrates a resource allocation with variable periodicity. FIG. 3 illustrates resources 302*a*-314*c* allocated to user equipment 1-7 (UE1-UE7). The horizontal axis of FIG. 3 illustrates time in milliseconds. The vertical axis of FIG. 3 illustrates resources per time. Each timeslice contains subframes in which a resource may be allocated to a device such as a user equipment (UE). By way of example, FIG. 3 illustrates a constant periodicity of 4 milliseconds for all UEs in a particular control channel, such as an uplink control channel. FIG. 3 further illustrates a total of seven resources for a given control channel. For the illustrated example, then, a maximum of 7×4=28 UEs could be supported according to the illustrated constant periodicity. For simplicity and clarity, FIG. 3 illustrates supporting 7 UEs operating in timeslots corresponding to t=0 ms, t=4 ms, and t=8 ms.

The present resource allocation may generally improve performance of control channels. For example, the present resource allocation may improve performance of uplink control channels such as a physical uplink control channel (PUCCH) in communication networks such as Long Term Evolution mobile networks (LTE). PUCCH carries information referred to as uplink control information (UCI). Depending on the type of information in UCI, PUCCH generally supports Formats 1 and 2, including Format Types 1, 1A, 1B, 2, 2A, and 2B. These PUCCH formats communicate control information such as resource availability.

Examples of resources allocated by the present resource allocation may include time-based and frequency-based resources. For example, the resources may include scheduling request (SR), uplink HARQ-ACK/-NACK, channel state information (CSI), and individual components of CSI such as channel quality indicator (CQI), precoding matrix indicator (PMI), and rank indicator (RI). The uplink HARQ-ACK/-NACK resource is generally determined based on N1_PUCCH, which is communicated from the network to the mobile device by higher layers in the network stack, as well as the lowest control channel element (CCE) of the corresponding physical downlink control channel (PD-CCH). The resource index for scheduling request (SR) as well as channel state information (CSI) is typically communicated in downlink. The SR resource has a periodicity as well as a "slot offset," both of which are communicated by higher layer signaling. CSI also has an associated periodicity as well as slot offset for individual components, i.e. channel quality indicator (CQI), precoding matrix indicator (PMI), and rank indicator (RI), all of which are also communicated by higher layer signaling. These resources are described in further detail in cellular specifications 3GPP TS 36.104, TS 36.211, and TS 36.213, all of which are provided by the 3rd Generation Partnership Project (3GPP), and the entire contents of all of which are incorporated by reference herein.

In general, resource allocation with constant periodicity allocates periodicity of resources so that the resources are distributed both in time and by resource. Example resources allocated according to constant periodicity may include SR and CQI reporting. For example, X may indicate a number of UEs supported in a cell, and Y may indicate a number of UEs supported per transmission time interval (TTI). A constant periodicity T may then be calculated as T=X/Y milliseconds. This resource allocation provides the same periodicity to each UE and generally reduces the complexity needed by a gateway such as an eNodeB or other base station. To support additional control resources per millisecond and generally increase the number X of UEs in a given cell, a service operator would increase the value of T or Y. Similarly, by holding constant the number Y of UEs supported per TTI, a service operator may increase the overall number X of UEs supported in a cell.

Assigning a periodicity to uplink resources also determines a periodicity of resource requests (which in turn affects resource acquisition rate, quality reporting, etc.). In general, the resource acquisition rate affects delay of a service and rate of quality reporting affects Block Error Ratio (BLER) of a service, respectively.

In some situations, a constant periodicity may not allocate resources efficiently or beneficially. For example, associated with a service is generally a certain delay tolerance and error tolerance. To satisfy delay and error tolerance, uplink resources benefit from being scheduled effectively and efficiently. For example, for low delay tolerance applications the present resource allocation uses smaller scheduling request (SR) periodicity to allow for more frequent scheduling requests for radio resources for transmission, for example from the UE to the eNodeB. For low error tolerance applications, the present resource allocation uses smaller channel quality indicator (CQI) periodicity (depending on channel coherence) to allow for more frequent updates on channel quality and modulation and coding scheme. Specifically, CQI generally indicates the highest modulation and code rate at which a block error rate (BLER) of a channel does not exceed a threshold percentage (e.g., 10%). Therefore, a resource allocation system that uses constant periodicity T or constant delay tolerance for all UEs might not allocate resources efficiently.

Generally, resource allocation using constant periodicity exhibits certain advantages. For example, constant periodicity provides deterministic resource allocation rather than non-deterministic resource allocation. One benefit of deterministic resource allocation is there are guaranteed to be no collisions between UEs (compared, for example, with FIG. 4 as described in further detail later). Furthermore, constant periodicity ensures that all resources are used (also compared, for example, with FIG. 4 and described in further detail later).

However, resource allocation using constant periodicity may also exhibit certain disadvantages. For example, constant periodicity means that the same periodicity (i.e., constant) is applied to all UEs, regardless of delay tolerance or error tolerance. Also, as described above, the number of UEs that can be accommodated depends on the value of the periodicity chosen (and vice versa). Also, a Channel Quality Indicator (CQI) report could be compromised for a Rank Indicator (RI) component when both occur at the same timeslot. Furthermore, preventing resource collisions in time would compromise the overall capacity of the cell. For example, if RI periodicity were to have the same value as CQI periodicity, no CQI wideband reports would be available.

FIG. 4 illustrates an example of a resource allocation 400 with variable periodicity, in accordance with certain embodiments. Resource allocation 400 includes resources 402a-420e allocated to User Equipment 1-8 (UE1-UE8), unused resources 406a-406c, and resource collisions 408a-408b. With variable periodicity, the resource allocation system allocates periodicity of resources such as Scheduling Requests (SRs) and Channel Quality Indicators (CQI) as necessary for a User Equipment (UE) service. For example, in some embodiments the resource allocation system determines a periodicity as a least common multiple (LCM) of the periodicity required by each bearer for a UE. With variable periodicity, since UEs may be configured with different periodicities, the system could have a subframe in time where there is a resource collision between two UEs.

An example of resource collision follows. The resource allocation system may have assigned resource x at time t=0, with periodicity T=20 ms for User Equipment 1 (UE1). In some embodiments, resource x may include scheduling requests (SR), uplink hybrid automatic repeat request acknowledgements or negative acknowledgements (uplink HARQ ACK/NACK), or channel state information (CSI) such as a channel quality indicator (CQI), precoder matrix indicator (PMI), or rank indicator (RI) in an LTE mobile network. The resource allocation system may also have assigned the same resource x at time t=$t_2$ with periodicity T=32 ms for User Equipment 2 (UE2). Resources may be therefore be needed according to the following formula:

$$t_2+(n\times32)=m\times20, \text{ where } n,m=0,1,2,3, \ldots$$

If the formula is satisfied for given values of m and n, then a resource collision may occur for UE1 and UE2. When resource collision occurs, if UE1 does not receive a grant due to the resource collision, then UE1 retries in the next resource cycle (e.g., the next cycle of SR). However there may be another resource collision when UE1 retries. UE1 would then lose resources for (2×20 ms). Therefore, resource collisions in variable periodicity resource allocation schemes may affect services whose delay tolerance is less than the time taken to acquire the uplink resource during such resource collisions. Also, as described in further detail below, variable periodicity may be non-deterministic—i.e., variable periodicity may not guarantee predictability of resource collision occurrences. Variable periodicity exhibits an advantage over constant periodicity of better response in terms of delay tolerance. In some embodiments, delay tolerance may be measured according to Quality of Service (QoS) parameters. However, potential resource collisions that might occur due to inherent flexibility of variable periodicity defeats QoS advantages unpredictably, as described in further detail below.

FIG. 4 illustrates resource allocation 400, in which UE1 has a periodicity of 3 ms and UE2 has a variable periodicity of 2 ms. In addition to resource collisions, variable periodicity also exhibits a disadvantage that some resources may be unused. For example, as illustrated at the subframe during interval t=2, resource 406a is empty because it is unused. Resource allocation 400 also illustrates a resource collision 408a between UE1 and UE2 at the subframe during interval t=3. During resource collisions, the resource also goes unused. Therefore, although resource allocation according to variable periodicity provides flexibility in periodicity, variable periodicity can cause reduced predictability, a loss of resources due to resource collisions (such as resource collisions 408a, 408b), and unused resources (such as unused resources 406a-406c).

As described above, an advantage of variable periodicity is flexibility in supported periodicity values (i.e., T). Variable periodicity may accommodate all values of periodicities. However, also as described above, disadvantages include that variable periodicity may be non-deterministic, leading to resource collisions between UEs. Furthermore, resource collisions affect all UEs that experienced the resource collision (rather than allocating a resource to one UE or another). Additionally, the next resource for the UE may also collide, meaning the UE may have to wait several cycles before receiving a resource at all. Lastly, numerous resources may be unused with variable periodicity as well.

Figure 5:
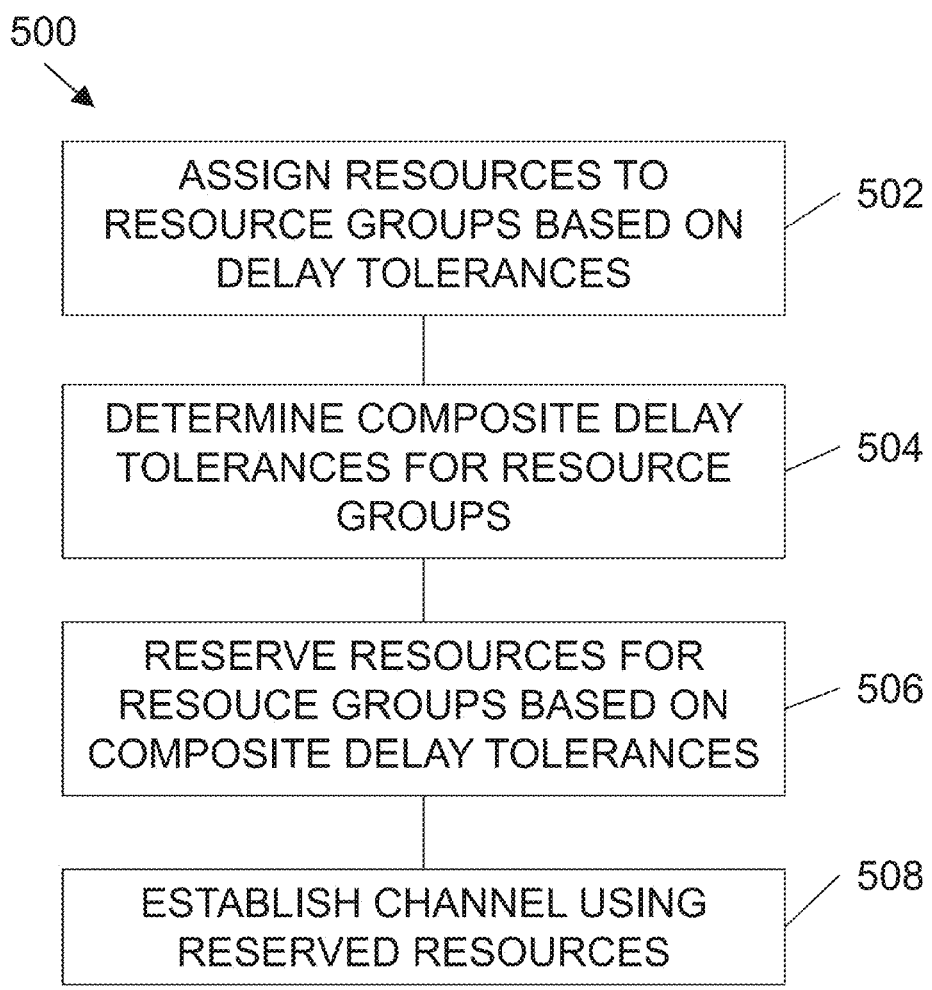
FIG. 5 illustrates a flowchart of an example of a resource allocation method using quantized periodicity with resource groups, in accordance with certain embodiments.

FIG. 5 illustrates a flowchart of an example of a resource allocation method 500 using quantized periodicity with resource groups, in accordance with certain embodiments. Rather than use constant periodicity or variable periodicity as described above in connection with FIGS. 3 and 4, respectively, the present resource allocation may use quantized periodicity. Quantized periodicity refers to a fixed, or quantized, periodicity assigned to resources that belong to a certain resource group.

The present resource allocation system assigns resources intended for a control channel of a mobile network to a number of resource groups based on delay tolerances of the resources (step 502). More specifically, the present resource allocation system assigns resources to resource groups based on delay tolerances of Quality of Service bearers for supporting the resources. The resources may have an associated periodicity and an associated delay tolerance. In some embodiments, the resources may also have an associated slot offset. The resources may be associated with one or more control channels such as uplink control channels. An example uplink control channel may be a physical uplink control channel (PUCCH) as used in an LTE mobile network. Example resources may include scheduling requests (SR), uplink hybrid automatic repeat request acknowledgements or negative acknowledgements (uplink HARQ ACK/NACK), or channel state information (CSI) such as a channel quality indicator (CQI), precoder matrix indicator (PMI), or rank indicator (RI) in the LTE mobile network. In some embodiments, the delay tolerances may be measured according to Quality of Service (QoS) parameters that reflect resource needs of a particular device such as a User Equipment (UE). The resource groups may be determined based on a total count of UEs in a cell, and based on services used by and delay tolerances needed by those UEs.

The present resource allocation system determines composite delay tolerances for the resource groups (step 504). In some embodiments, the composite delay tolerance may be a mean periodicity, also known as an average periodicity, for the resource group. The mean periodicity may reflect QoS needs of resources belonging to the resource group. In other embodiments, the composite delay tolerance may be a median periodicity of the resources belonging to the resource group. In still other embodiments, the composite delay tolerance may be a mode periodicity of the resources belonging to the resource group. The composite delay tolerances are selected to accommodate disparate delay tolerances of resources belonging to the resource group.

The present resource allocation system reserves resources for resource groups based on the composite delay tolerances of the resource groups (step 506). In some embodiments, the present resource allocation system may reserve resources by determining ratios $a_1, a_2, a_3, a_4, \ldots$ of total uplink control channel resources for the resource groups. The ratios may be selected based on density of delay tolerances, such as QoS needs or QoS parameters in a given cell. The total resources $G_x$ reserved for a given resource group may be given by $G_x=(a_x \times N \times T_x)$, for a given resource group x, selected ratio $a_x$, and periodicity $T_x$, where N reflects the total number of resources available for an uplink control channel. The present resource allocation system proceeds to establish the control channel with a user equipment (UE), using the reserved resources (step 508). The UE is then able to send data to and receive data from an eNodeB in uplink or downlink.

In some embodiments, process 500 may also be used with multiple control channels, where the present resource allocation provides different resource allocations to the control channels based on assigning different resource groups.

Figure 6:
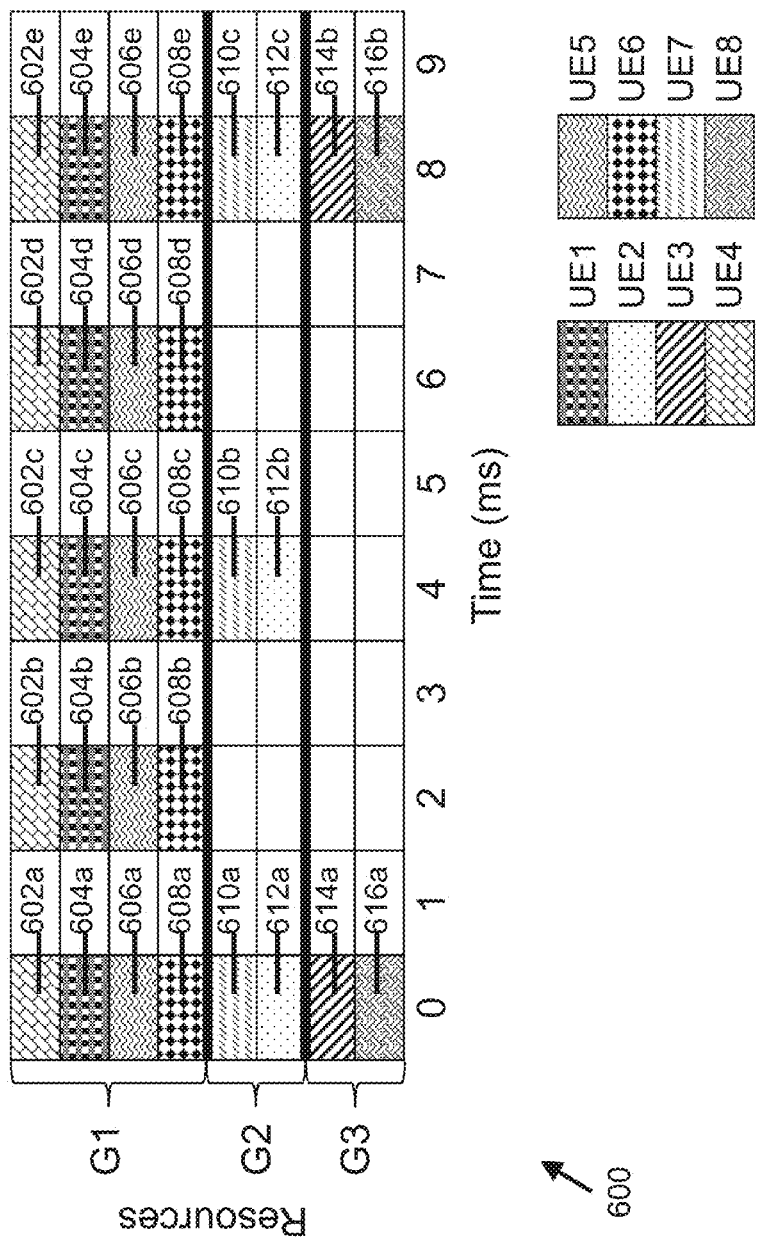
FIGS. 6 and 7 illustrate examples of resource allocations using quantized periodicity with resource groups, in accordance with certain embodiments.

FIG. 6 illustrates an example of a resource allocation 600 using quantized periodicity with resource groups, in accordance with certain embodiments. As described above for resource allocation process 500 (shown in FIG. 5), resource allocation 600 includes resource groups G1-G3. Also as described earlier in connection with FIG. 5, the resource groups may be allocated according to services with similar delay tolerances. Therefore, resource group G1 may include resources 602*a*-608*e* with similar delay tolerances allocated to User Equipment 1 and 4-6 (UE1, UE4-UE6). Resource group G2 may include resources 610*a*-612*c* also with similar delay tolerances allocated to UE2, UE7. Resource group G3 may include resources 614*a*-616*b* also with similar delay tolerances allocated to UE3, UE8. In general, the cell design allocates resource elements (RE) required for a given control channel (or control channels) based on uplink transmission bandwidth. For example, the total resources in the uplink for a particular control channel could be divided based on Quality of Service (QoS) groups.

If the present resource allocation system allocates four groups G1-G4 (G4 not shown), the delay tolerances of resources in the resource groups may have the following relationship.

(*G*1 delay tolerance)<(*G*2 delay tolerance)<(*G*3 delay tolerance)<(*G*4 delay tolerance).

The present resource allocation system then determines a composite delay tolerance. As described earlier, the present resource allocation system may assign a mean periodicity for each resource group. The mean periodicity can represent all Quality of Service (QoS) parameters in the corresponding resource group. Let T1-T4 represent these mean periodicities respectively, and let T1-T4 obey the relation T1<T2<T3<T4. This example relation indicates that resource group G1 is less able to tolerate delays in packet delivery, or lower QoS, than resource group G2, and so on with resource groups G2-G4.

The present resource allocation system reserves resources for the resource groups, by determining ratios $a_1, a_2, a_3$, and $a_4$ of total uplink resources for the resource groups. For example, the uplink resources may represent an ability of corresponding UEs to benefit from improved performance and lower delays for the resource group. Because $a_1$-$a_4$ divide a total number of uplink resources, $a_1+a_2+a_3+a_4=1$. The density of QoS for a cell may be used to determine values for $a_1, a_2, a_3$, and $a_4$. As described earlier, the total amount of resources allocated to resource group $G_1$ may be given by $G_1=(a_1 \times N \times T_1)$/ms, for a selected ratio $a_1$, and mean periodicity $T_1$, where N reflects the total number of resources available for an uplink control channel. Similarly, the total amount of resources allocated to resource group $G_2$ may be given by $G_2=(a_2 \times N \times T_2)$/ms, and generally the total resources reserved for a given resource group $G_x$ may be given by $G_x=(a_x \times N \times T_x)$.

As described earlier in connection with FIG. 5, in some embodiments the present resource allocation may be used with different uplink control channels, where the different channels have different distributions of resources based on different resource groups. For example, a resource grouping of scheduling request (SR) resources for a given channel could be performed based on delay tolerance, while a grouping for channel quality indicator (CQI) resources for another channel could be based on bearers for a UE, in which bearers with low delay tolerance and low block error rate (BLER) dictate overall CQI periodicity. By way of further example, let SG={X1, X2, X3} be a set of resource groupings according to scheduling request (SR) resources, where resource groups X1, X2, X3 have corresponding ratios {a1, a2, a3}. Furthermore, let CG={Y1, Y2, Y3, Y4} be a set of resource groupings according to channel quality indicator (CQI) resources such as precoding matrix indicator (PMI), where resource groups Y1, Y2, Y3, Y4 have corresponding ratios {b1, b2, b3, b4}. By using the present resource allocation across multiple channels, a user equipment UE1 could be assigned to U1G={X1, Y4}, having respective ratios {a1, b4} and respective mean periodicities $\{T_{SR-1}, T_{CQI-PMI-4}\}$.

As illustrated in FIG. 6, resource allocation 600 shows eight resources in uplink per subframe. UE1 has periodicity $T_{UE1}=2$ ms and belongs to resource group G1, UE2 has periodicity $T_{UE2}=4$ ms and belongs to resource group G2, and UE3 has periodicity $T_{UE3}=8$ ms and belongs to resource group G3. (The illustrated UEs have offset 0.) In general, resource group G1 includes resources 602*a*-608*e* with similar delay tolerances. Resource group G2 includes resources 610*a*-612*c* also with similar delay tolerances. Resource group G3 includes resources 614*a*-616*b* also with similar delay tolerances. The illustrated ratios for resource groups G1, G2, and G3 are $a_1=0.5$, $a_2=0.25$, and $a_3=0.25$, respectively. Mean periodicities for resource groups G1, G2, and G3 are T1=2 ms, T2=4 ms, and T3=8 ms, respectively. The total resources allocated to resource groups G1, G2, and G3 by the present resource allocation may be determined as $$NG1 = a_1 \times N \times T1 = 0.5 \times 8 \times 2 = 8,$$

$$NG2 = a_2 \times N \times T2 = 0.25 \times 8 \times 4 = 8, \text{ and,}$$

$$NG3 = a_3 \times N \times T3 = 0.25 \times 8 \times 8 = 16, \text{respectively.}$$

As illustrated in FIG. 6, the total number of UEs that can be supported in the example is NG1+NG2+NG3=32. The number of supported UEs may differ across periodicity schemes, i.e. from the present quantized periodicity with resource groups to the constant periodicity and variable periodicity described earlier. As can be seen from the values of NG1 (8), NG2 (8), and NG3 (16), the cell is expected to have more UEs in the NG3 group for the particular illustrated uplink control channel, which also preferentially serves the UEs with lower delay tolerance.

This quantized periodicity with resource groups can include one or more of the following advantages. Due to periodicity grouping, the flexibility in assigning periodicity that would otherwise be seen in a variable periodicity system is mitigated by assigning UEs to their closest possible resource group. In some embodiments, the assignments can be determined based on delay tolerance. Also, resource allocation is deterministic for a UE. Therefore, unlike variable periodicity, there is no loss due to resource collision between UEs. Furthermore, unlike constant periodicity which exhibits limits on the number of UEs overall that can be supported, this requirement is modified to be based on a number of UEs that need a particular service that can be supported. With this perspective on capacity, the present resource allocation can support more UEs than constant periodicity, without compromising quality of service.

There are some potential issues as well. The ratios and mean periodicity should be chosen wisely by service operators to try to avoid loss of capacity. Also, multiplying the ratios by the total resources does not always result in a whole number as shown above. In some embodiments, the present resource allocation uses arbitration in assigning resources in such cases.

Figure 7:
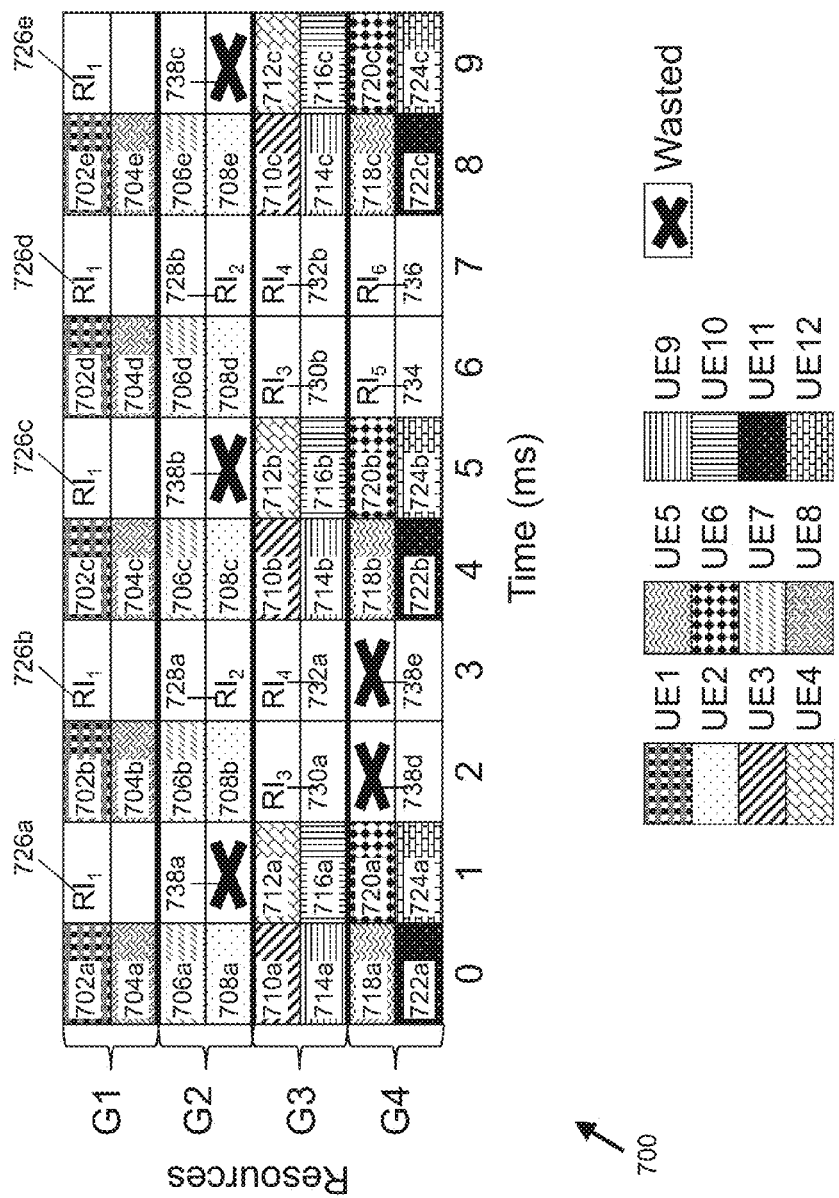

In certain situations with resource conflicts, overall capacity of the cell may be affected. FIG. 7 illustrates certain embodiments of the present resource allocation that address resource conflicts using examples of conflicts between (1) rank indicator (RI), and (2) channel quality indicator (CQI) or precoding matrix indicator (PMI). As described in further detail below, these resources generally measure transmission quality in downlink. A user equipment (UE) can measure all three resources and transmit the information in uplink to the base station. In some embodiments, the base station uses the values of the resources to adjust the downlink accordingly. These resources are described in cellular specification 3GPP TS 36.521-1 V9.3.0, the entire contents of which are incorporated by reference herein.

FIG. 7 illustrates an example of a resource allocation 700 using quantized periodicity with resource groups, in accordance with certain embodiments. FIG. 7 illustrates resource groups G1-G4. Resource group G1 includes CQI-PMI resources 702a-704e allocated to User Equipment 1, 8 (UE1, UE8) and rank indicator 1 ($RI_1$) 726a-726e. Resource group G2 includes CQI-PMI resources 706a-708e allocated to UE2, UE7; rank indicator $RI_2$ 728a-728b; and wasted resources 738a-738c. Resource group G3 includes CQI-PMI resources 710a-716c allocated to UE3, UE4, UE9, UE10, and rank indicators $RI_3$ 730a-730b and $RI_4$ 732a-732b. Resource group G4 includes CQI-PMI resources 718a-724c allocated to UE5, UE6, UE11, UE12; rank indicators $RI_5$ 734, $RI_6$ 736; and wasted resources 738d, 738e.

In some embodiments, the present resource allocation may manage collisions between RI and CQI or PMI, described above in connection with FIG. 6, by allocating the resource groups again based on rank indicator (RI). As described earlier, the channel quality indicator (CQI) resource generally indicates the highest modulation and code rate at which a block error rate (BLER) of a channel does not exceed a threshold percentage (e.g., 10%). The precoding matrix indicator (PMI) resource generally determines how individual data streams, or layers, map to multiple antennas. Varying the selection of the precoding matrix may yield an improved number of data bits, which a user equipment (UE) is able to receive together across data streams. However, the precoding matrix is helped by an understanding of channel quality of each antenna in downlink. The UE may determine this channel quality via certain measurements. If the UE knows what precoding matrices are allowed, the UE can send a PMI report to the base station and suggest a suitable precoding matrix. The UE can therefore use PMI reporting to recommend a downlink precoding matrix to the base station that may achieve high data throughput for a given channel state. The rank indicator (RI) resource generally includes channel rank, which indicates the number of data streams, or layers in LTE, and the number of signal streams transmitted in downlink. A goal of improving RI is to improve channel capacity across available downlink bandwidth, by taking advantage of each full channel rank. Furthermore, CQI, PMI, and RI generally interact to measure a state or quality of a channel. The value of RI generally influences allowed precoding matrices and CQI values. The base station uses CQI reporting to adapt the downlink channel.

RI and CQI services may have different periodicity values, and these RI and CQI periodicities may collide with regularity. That is, rather than identifying resource groups by pairs {ratio1, mean periodicity}, the present resource allocation uses resource groups identified by tuples incorporating the conflicting resources. Examples of tuples may include {ratio2, mean periodicity of CQI-PMI ($T_{CQI-PMI}$), mean periodicity of RI ($T_{RI}$)}. Accordingly, there are (ratio2×N) resources with CQI-PMI periodicity $T_{CQI-PMI}$ and with RI periodicity $T_{RI}$. The maximum capacity for CQI-PMI is $[(ratio \times N) \times T_{CQI-PMI}/2]$. For a particular resource group, the number of wasted resources may be given by $[(ratio \times N) \times T_{CQI-PMI}/2] \times [(T_{RI}/T_{CQI-PMI})-1]$. Advantageously, the wasted resources are resources otherwise reserved for RI reporting. As can be seen from the equation above, for a given ratio and $T_{CQI-PMI}$ the larger the RI periodicity compared to the CQI-PMI periodicity, the higher the waste. Furthermore, according to the embodiments described above, the number of UEs supported for a resource group is given by (ratio×N×$T_{CQI-PMI}/2$).

As described earlier, FIG. 7 illustrates a resulting resource allocation system that uses the embodiments described above in FIG. 6, rather than accounting for collisions between RI and CQI-PMI. FIG. 7 illustrates resources 702a-724c for CQI-PMI used by UE1-UE12 in their respective resource groups. Table 1 below describes corresponding resources used for RI by respective UEs UE1-UE6.

TABLE 1

| RI resources | | |
| --- | --- | --- |
| User Equipment Identifier | Group | RI resource identifier |
| UE1 | G1 | $RI_1$ 726a-726e |
| UE2 | G2 | $RI_2$ 728a-728b |
| UE3 | G3 | $RI_3$ 730a-730b |
| UE4 | G3 | $RI_4$ 732a-732b |
| UE5 | G4 | $RI_5$ 734 |
| UE6 | G4 | $RI_6$ 736 |

Table 2 below describes sample resource group attributes for total control channel resources for PUCCH Format 2, with N=8.

TABLE 2

| Sample Resource Group Attributes | | | | |
| --- | --- | --- | --- | --- |
| Group | Ratio a | Mean CQI periodicity $T_{CQI-PMI}$ | Mean RI periodicity $T_{RI}$ | Total wasted resources in a CQI period |
| G1 | 0.25 | 2 ms | 2 ms | (0.25 × 8) × 0 = 0 |
| G2 | 0.25 | 2 ms | 4 ms | (0.25 × 8) × 1 = 2 |
| G3 | 0.25 | 4 ms | 4 ms | (0.25 × 8) × 0 = 0 |
| G4 | 0.25 | 4 ms | 8 ms | (0.25 × 8) × 2 = 4 |

In some embodiments, accounting for collisions between RI and CQI-PMI results in the improved outcome shown below:

$G1_N$ and $G2_N=0.25\times8\times2=4$ $G3_N$ and $G4_N=0.25\times8\times4=8$

Total=$G1_N+G2_N+G3_N+G4_N=4+4+8+8=24$

Therefore, twenty-four UEs can be accommodated using the embodiments described herein to prevent collisions between CQI-PMI and RI. In contrast, allowing CQI-PMI collision with RI resources yields Total=24/2=12, meaning only twelve UEs can be accommodated.

Allowing resource collisions between CQI-PMI and RI improves overall capacity but suffers when corresponding RI periodicity and CQI periodicity are comparable. For large RI periodicity, the present resource allocation can allow for collision, as collision becomes very infrequent and may not affect QoS. However, if CQI periodicity is also large enough, loss of a CQI resource may affect adaptive modulation and coding mechanisms for downlink.

Figure 8:
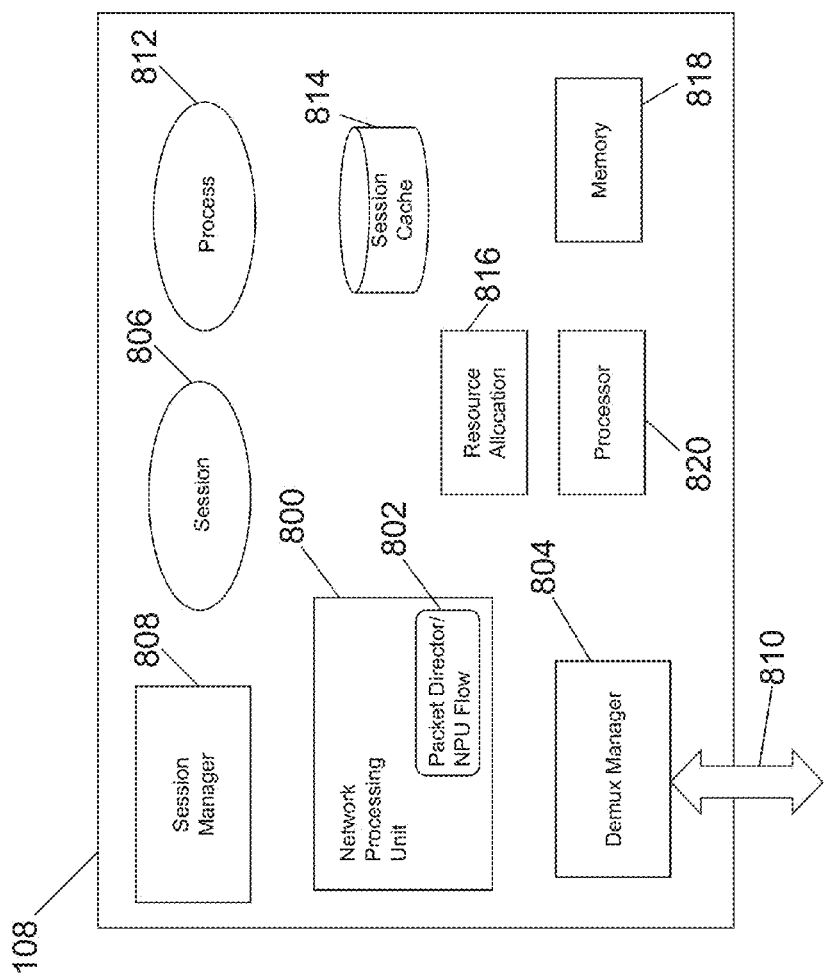
FIG. 8 illustrates a logical view of an intermediary node that implements resource allocation in accordance with certain embodiments.

FIG. 8 illustrates a logical view of an intermediary node that implements resource allocation in accordance with certain embodiments. The intermediary node includes a network processing unit (NPU) 800, a packet director/NPU flow 802, a demux manager 804, sessions 806, a session manager module 808, an input/output interface 810, a process 812, a session cache 814, resource allocation module 816, memory 818, and a processor 820. Interface 810 includes one or more physical connections that can be either wired or wireless to communicate information to and from NPU 800. Session manager module 808 works with interface 810 to provide signals to communicate information from NPU 800 and to receive information from interface 310.

NPU 800 receives electrical or optical signals on interface 810 from the access networks and transmits network information such as resource information, delay tolerances, resource periodicities, and resource groups to and from mobile devices. Processor 820 can be one or more integrated circuits that are a multipurpose, programmable, clock-driven, register-based electronic device that accepts binary data as input, processes it according to instructions stored in its memory, and provides results as output. In some embodiments, processor 820 can be constructed for a specific purpose such as a network processing unit 800 to perform resource allocation or another specific task.

Memory 818 can be any type of computer readable medium such as random access memory (RAM), programmable read-only memory (PROM), a field programmable gate array (FPGA), flash memory, optical disk drive, or magnetic storage medium. Memory 818 can be used to store computer programs or logic that can be run on processor 820. Memory 818 can also store information such as data structures and other data that is used for providing resource allocation and for providing resource periodicities, resource groups, and delay tolerances relevant to resource allocation such as Quality of Service. Session manager 808 can be hardware or software for performing resource allocation. Session manager 808 can receive delay tolerances, resource groups, and resource periodicities on interface 810. In this fashion, session manager 808 can use delay tolerances, resource groups, and resource periodicities to allocate resources in some embodiments.

Processor 820 and memory 818 are used to provide session manager 808, packet director 802, and demux manager 804. For example, session manager 808 and processor 820 can include information stored in memory 818 upon which action is taken by processor 820. In some embodiments, session manager 808 can be implemented as a module that is a combination of hardware and software. Session manager 808 includes data stored in memory 818 such as delay tolerances. Multiple session managers 808 can be used in an intermediary node. Session managers 808 can communicate with NPU 800 to allocate resources using delay tolerances, resource groups, and resource periodicities.

Resource allocation module 816 is a module that works in conjunction with network processing unit 800, session 806, and memory 818. Resource allocation module 816 can be implemented using software that is stored in memory 818 and running on processor 820. Resource allocation module 816 can correlate resource groups, delay tolerances, and resource periodicities to allocate resources. This resource allocation can be executed to improve performance of an uplink control channel such as a Physical Uplink Control Channel (PUCCH).

User Equipment and Gateway

The user equipment (UE) described above can communicate with a plurality of radio access networks using a plurality of access technologies and with wired communication networks. The user equipment can be a smart phone offering advanced capabilities such as word processing, web browsing, gaming, e-book capabilities, an operating system, and a full keyboard. The user equipment may run an operating system such as Symbian OS, Apple iOS, Blackberry OS, Windows Mobile, Linux, Palm WebOS, and Google Android. The screen may be a touch screen that can be used to input data to the mobile device and the screen can be used instead of the full keyboard. The user equipment may have the capability to run applications or communicate with applications that are provided by servers in the communication network. The user equipment can receive updates and other information from these applications on the network.

The user equipment also encompasses many other devices such as televisions (TVs), video projectors, set-top boxes or set-top units, digital video recorders (DVR), computers, netbooks, laptops, and any other audio/visual equipment that can communicate with a network. The user equipment can also keep global positioning coordinates, profile information, or other location information in its stack or memory. The user equipment can have a memory such as a computer readable medium, flash memory, a magnetic disk drive, an optical drive, a programmable read-only memory (PROM), and/or a read-only memory (ROM). The user equipment can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

Figure 9:
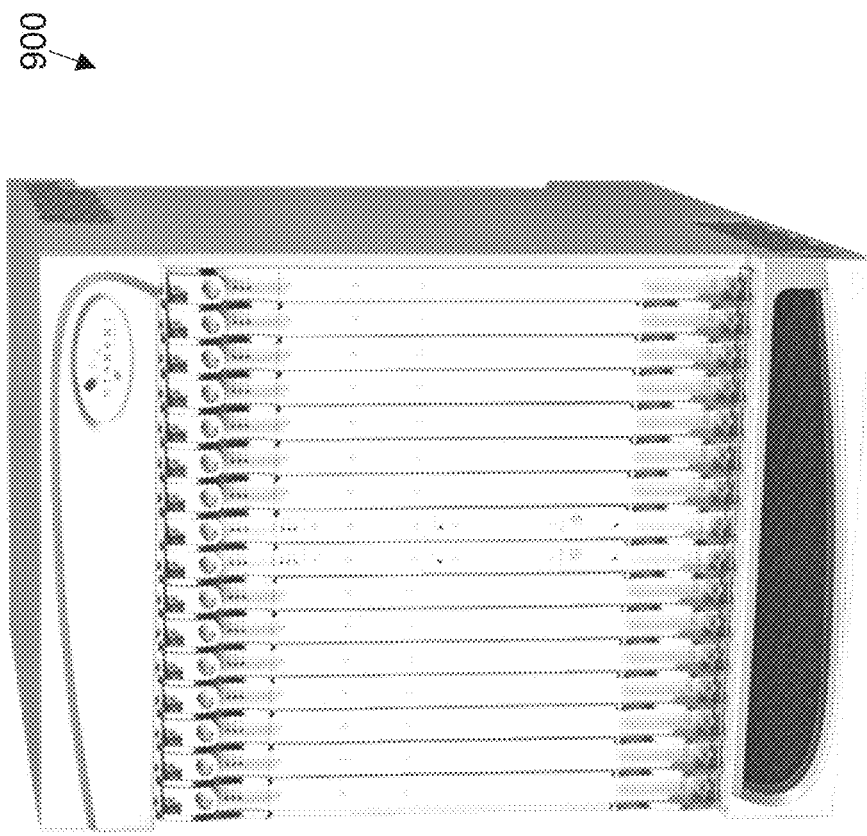
FIGS. 9-11 illustrate a network device for resource allocation in accordance with certain embodiments.

FIG. 9 illustrates a network device 900 for resource allocation in accordance with certain embodiments. The resource allocation gateway described above is implemented in network device 900 in some embodiments. Network device 900 can implement multiple and different integrated functionalities. In some embodiments, one or more of the following functionalities can be implemented on network device 900 including an evolved Node B (eNodeB), a security gateway (SeGW), an access gateway, a Gateway General packet radio service Serving Node (GGSN), a serving GPRS support node (SGSN), a packet data interworking function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA).

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintaining traffic management for the mobile node. The resource allocation gateway can be implemented as any combination of the following including an xGSN, an xGW, an xGW-SGW, and an xGW-PGW.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below.

Figure 10:
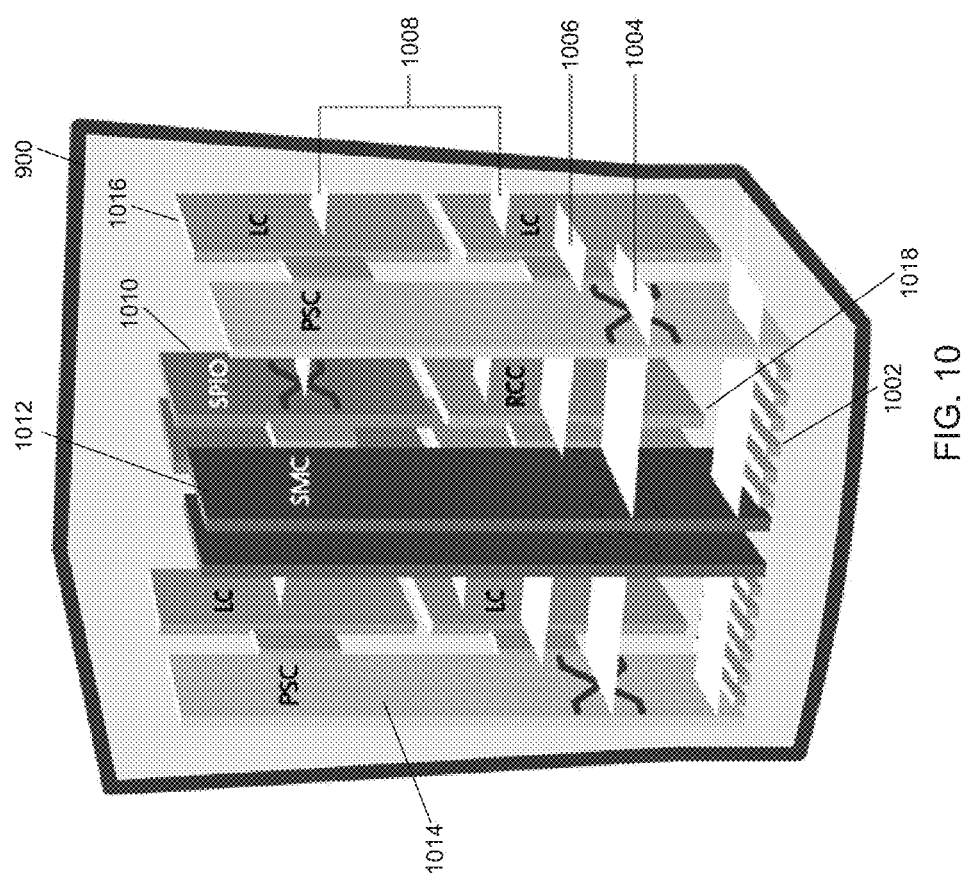

FIG. 10 illustrates the implementation of a network device 900 in accordance with some embodiments. Network device 900 includes slots 1002 for loading application cards and line cards. A midplane can be used in network device 900 to provide intra-network device communications, power connections, and transport paths between the various installed cards. The midplane can include buses such as a switch fabric 1004, a control bus 1006, a system management bus, a redundancy bus 1008, and a time division multiplex (TDM) bus (not shown). Switch fabric 1004 is an IP-based transport path for user data throughout the network device implemented by establishing inter-card communications between application cards and line cards. Control bus 1006 interconnects the control and management processors within the network device. The network device management bus provides management of system functions such as supplying power, monitoring temperatures, board status, data path errors, card resets, and other failover features. Redundancy bus 1008 provides transportation of user data and redundancy links in the event of hardware failures. The TDM bus provides support for voice services on the system.

The network device supports at least four types of application cards: a switch processor I/O card (SPIO) 1010, a system management card (SMC) 1012, a packet service card (PSC) 1014, and a packet accelerator card (not shown). Other cards used in the network device include line cards 1016 and redundant crossbar cards (RCC) 1018. Line cards 1016, when loaded in the network device, provide input/output connectivity to the network and other devices, as well as redundancy connections. Line cards 1016 include interfaces to the network through Ethernet, Fiber Optic, and the other communication mediums. Redundant crossbar card (RCC) 1018 includes a non-blocking crossbar and connections to each of the cards in the network device. This allows a redundant connection to be made through redundant crossbar card 1018 from any one card to any other card in the network device. SPIO card 1010 serves as a controller of the network device and is responsible for such things as initializing the network device and loading software configurations onto other cards in the network device.

System management card (SMC) 1012 and switch processor card (not shown) are system control and management cards for managing and controlling other cards in the network device. Packet accelerator card (PAC) and packet service card (PSC) 1014 provide packet processing, context processing capabilities, and forwarding capabilities among other things. PAC and PSC 2014 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks.

Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power.

Figure 11:
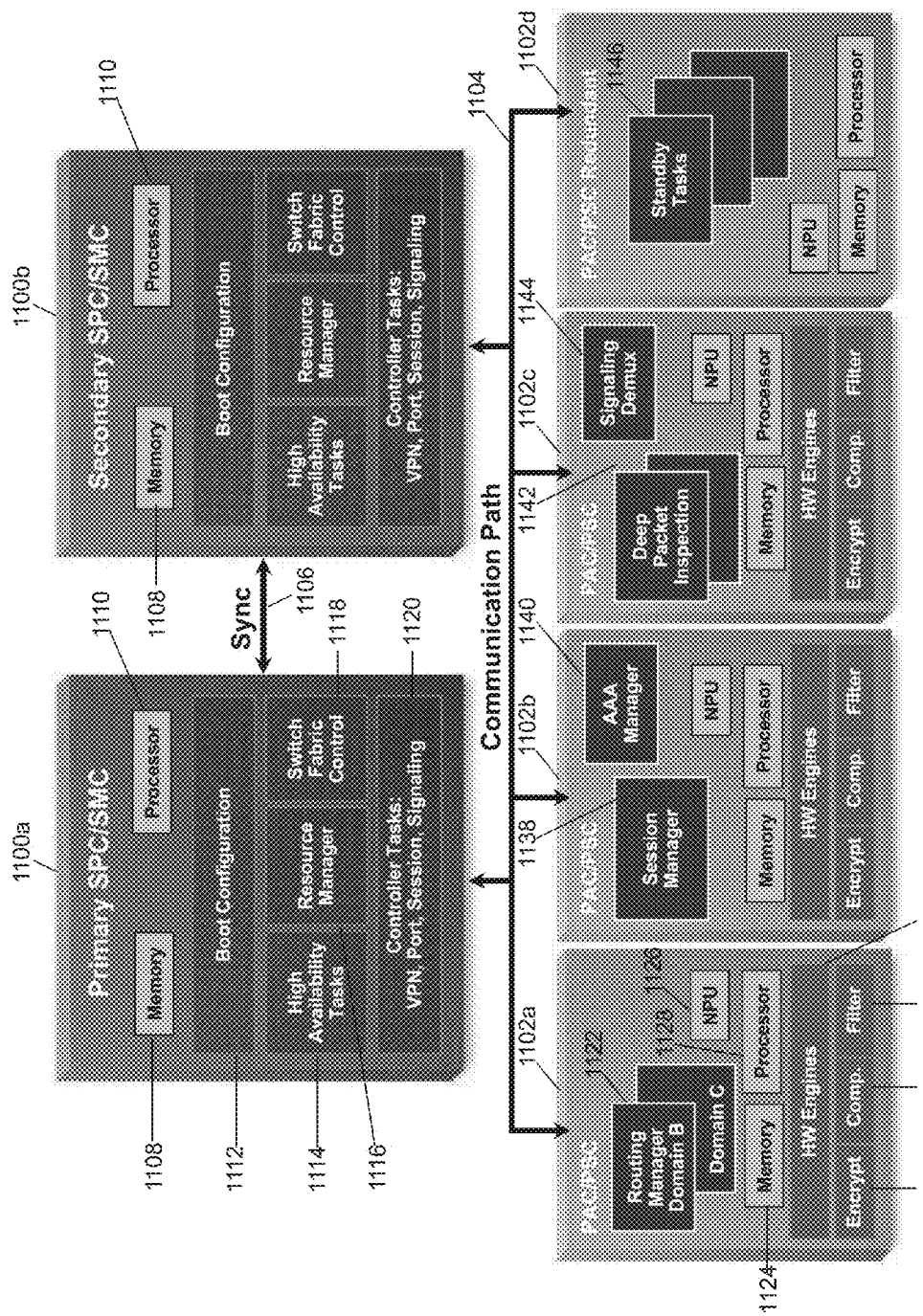

FIG. 11 illustrates a logical view of the software architecture of a network device in accordance with certain embodiments. As shown, the software and hardware can be distributed within the network device and across different circuit boards, processors, and memory. FIG. 11 includes a primary switch processor card (SPC)/system management card (SMC) 1100a, a secondary SPC/SMC 1100b, PAC/PSC 1102a-1102d, a communication path 1104, and a synchronization path 1106. The SPC/SMC 1100 include a memory 1108, a processor 1110, a boot configuration 1112, high availability tasks 1114, resource manager 1116, switch fabric control 1118, and controller tasks 1120.

SPC/SMC 1100 manage and control the network device including the other cards in the network device. SPC/SMC 1100 can be configured in a primary and secondary arrangement that provides redundancy and failsafe protection. The modules or tasks running on SPC/SMC 1100 are related to network device wide control and management. Boot configuration task 1112 includes information for starting up and testing the network device. The network device can also be configured to startup in different configurations and providing different implementations. These can include which functionalities and services are capable of running on SPC/SMC 1100. High availability task 1114 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 1100 or PAC/PSC 1102, while some processor intensive tasks can also be performed across multiple PACs/PSCs to utilize multiple CPU resources. Distribution of these tasks is invisible to the user. Switch fabric control 1118 controls the communication paths in the network device. Controller tasks module 1120 can manage the tasks among the resources of the networks to provide, for example, VPN services, assign ports, and create, delete, and modify sessions for user equipment.

PAC/PSC 1102 are high-speed processing cards that are designed for packet processing and the tasks involved with providing various network functionalities on the network device. PAC/PSC 1102 include a memory 1124, a network processing unit (NPU) 1126, a processor 1128, a hardware engine 1130, an encryption component 1132, a compression component 1134, and a filter component 1136. Hardware engines 1130 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 1102 is capable of supporting multiple contexts. PAC/PSC 1102 are also capable of running a variety of tasks or modules. PAC/PSC 1102a provides routing managers 1122 with each covering routing of a different domain. PAC/PSC 1102b provides a session manager 1138 and an AAA manager 1140. Session manager 1138 manages one or more sessions that correspond to one or more user equipment. A session allows a user equipment to communicate with the network for voice calls and data. AAA manager 1140 manages accounting, authentication, and authorization with an AAA server in the network. PAC/PSC 1102 provides a deep packet inspection task 1142 and a signaling demux 1144. The deep packet inspection task 1142 provides inspection of packet information beyond layer 4 for use and analysis by the network device. Signaling demux 1144 can provide scalability of services in combination with other modules. PAC/PSC 1102d provides redundancy through standby tasks 1146. Standby tasks 1146 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims.

What is claimed is:

1. A method comprising:
    identifying, by a base station, a plurality of resources intended for an uplink control channel of a mobile network, a resource comprising a type of message to be sent periodically to the base station by a user equipment (UE) of a plurality of UEs, each resource associated with a delay tolerance indicating how sensitive the UE is to delays in delivery of data packets and a period indicating how often the resource should be sent;
    assigning the plurality of resources to a plurality of resource groups based at least in part on the delay tolerances associated with the resources;
    determining a quantized period for a first resource group of the plurality of resource groups based at least in part on the periods associated with resources assigned to the first resource group;
    reserving resources associated with the control channel for the first resource group based at least in part on the quantized period determined for the first resource group.

2. The method of claim 1, wherein the reserving the resources associated with the control channel for the first resource group comprises reserving resources based on a ratio indicating a portion of the channel to be used for the first resource group.

3. The method of claim 1, wherein the assigning the resources to the resource groups further comprises:
    identifying a resource that may collide with another resource; and
    assigning the resources to the resource groups further based at least in part on the identified resource.

4. The method of claim 3,
    wherein the identified resource comprises a rank indicator (RI) resource, and
    wherein the other resource comprises a channel quality indicator (CQI) or a precoder matrix indicator (PMI) resource.

5. The method of claim 1, wherein the assigning the resources to the resource groups is further based at least in part on a count of user equipment (UEs) in a cell and on services used by the UEs in the cell.

6. The method of claim 1, wherein the resources comprise one or more of a scheduling resource (SR), an uplink hybrid automatic repeat request acknowledgement (HARQ-ACK), an uplink hybrid automatic repeat request non-acknowledgement (HARQ-NACK), a channel state information (CSI), a channel quality indicator (CQI), a precoding matrix indicator (PMI), or a rank indicator (RI).

7. The method of claim 1, wherein the delay tolerances comprise Quality of Service (QoS) parameters.

8. The method of claim 1, wherein the quantized period comprises a mean period.

9. The method of claim 1, wherein the control channel comprises an uplink control channel, and wherein the mobile network comprises a Long Term Evolution (LTE) mobile network.

10. A network device comprising:
    an interface; and
    a processor in communication with the interface;
    wherein the network device is to:
        identify a plurality of resources intended for an uplink control channel of a mobile network, a resource comprising a type of message to be sent periodically to the network device by a user equipment (UE) of a plurality of UEs, each resource associated with a delay tolerance indicating how sensitive the UE is to delays in delivery of data packets and a period indicating how often the resource should be sent;
        assign the plurality of resources to a plurality of resource groups based at least in part on the delay tolerances associated with the resources;

determine a quantized period for a first resource group of the plurality of resource groups based at least in part on the periods associated with the resources assigned to the first resource group; and reserve resources associated with the control channel for the first resource group based at least in part on the quantized period determined for the first resource group.

11. The network device of claim 10, wherein the network device is to reserve the resources associated with the control channel for the first group based on a ratio indicating a portion of the channel to be used for the first resource group.

12. The network device of claim 10, wherein the network device is to:

identify a resource that may collide with another resource; and assign the resources to the resource groups further based at least in part on the identified resource that may collide.

13. The network device of claim 12, wherein the identified resource comprises a rank indicator (RI) resource, wherein the other resource comprises a channel quality indicator (CQI) or a precoder matrix indicator (PMI) resource.

14. The network device of claim 10, wherein the network device is to assign the resources based at least in part on a count of user equipment (UEs) in a cell and on services used by the UEs in the cell.

15. The network device of claim 10, wherein the resources comprise one or more of a scheduling resource (SR), an uplink hybrid automatic repeat request acknowledgement (HARQ-ACK), an uplink hybrid automatic repeat request non-acknowledgement (HARQ-NACK), a channel state information (CSI), a channel quality indicator (CQI), a precoding matrix indicator (PMI), or a rank indicator (RI).

16. The network device of claim 10, wherein the delay tolerances comprise Quality of Service (QoS) parameters.

17. The network device of claim 10, wherein the quantized period comprises a mean period.

18. The network device of claim 10, wherein the control channel comprises an uplink control channel, and wherein the mobile network comprises a Long Term Evolution (LTE) mobile network.

19. One or more non-transitory media comprising logic that when executed is to:

identify, by a base station, a plurality of resources intended for an uplink control channel of a mobile network, a resource comprising a type of message to be sent periodically to the base station by a user equipment (UE) of a plurality of UEs, each resource associated with a delay tolerance indicating how sensitive the UE is to delays in delivery of data packets and a period indicating how often the resource should be sent;

assign the plurality of resources to a plurality of resource groups based at least in part on the delay tolerances associated with the resources;

determine a quantized period for a first resource group of the plurality of resource groups based at least in part on the periods associated with the resources assigned to the first resource group; and reserve resources associated with the control channel for the first resource group based at least in part on the quantized period determined for the first resource group.

20. The media of claim 19, wherein the logic is further to:

identify a resource that may collide with another resource; and assign the resources to the resource groups further based at least in part on the identified resource that may collide.

* * * * *